Jan. 23, 1940.   C. E. KRAUS   2,187,744
METHOD OF AND APPARATUS FOR FACE MILLING
Filed April 9, 1937   6 Sheets-Sheet 1
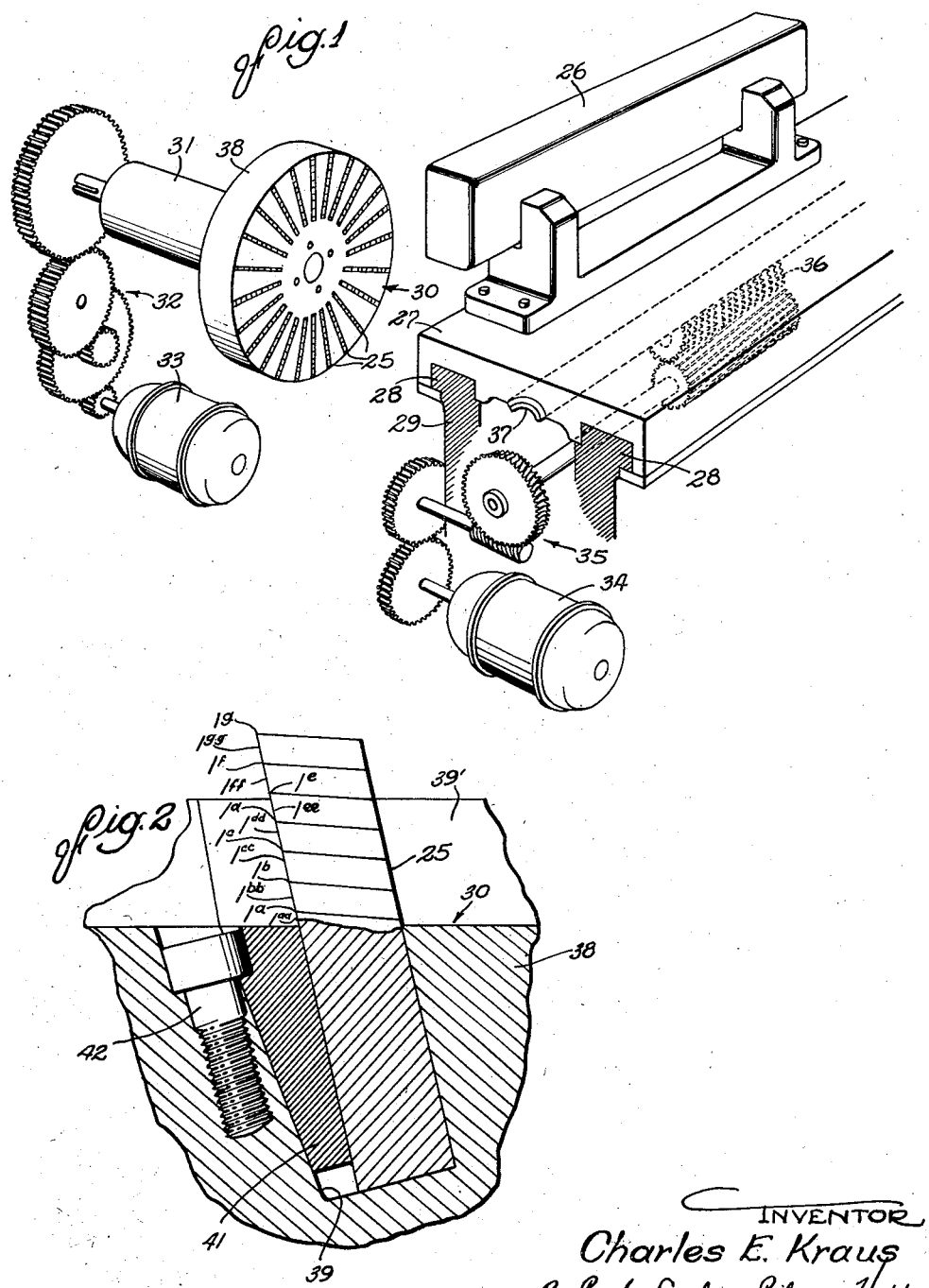
INVENTOR
Charles E. Kraus
By Parker, Carlson, Pitzner & Hubbard
ATTORNEYS Jan. 23, 1940.   C. E. KRAUS   2,187,744
METHOD OF AND APPARATUS FOR FACE MILLING
Filed April 9, 1937   6 Sheets-Sheet 2
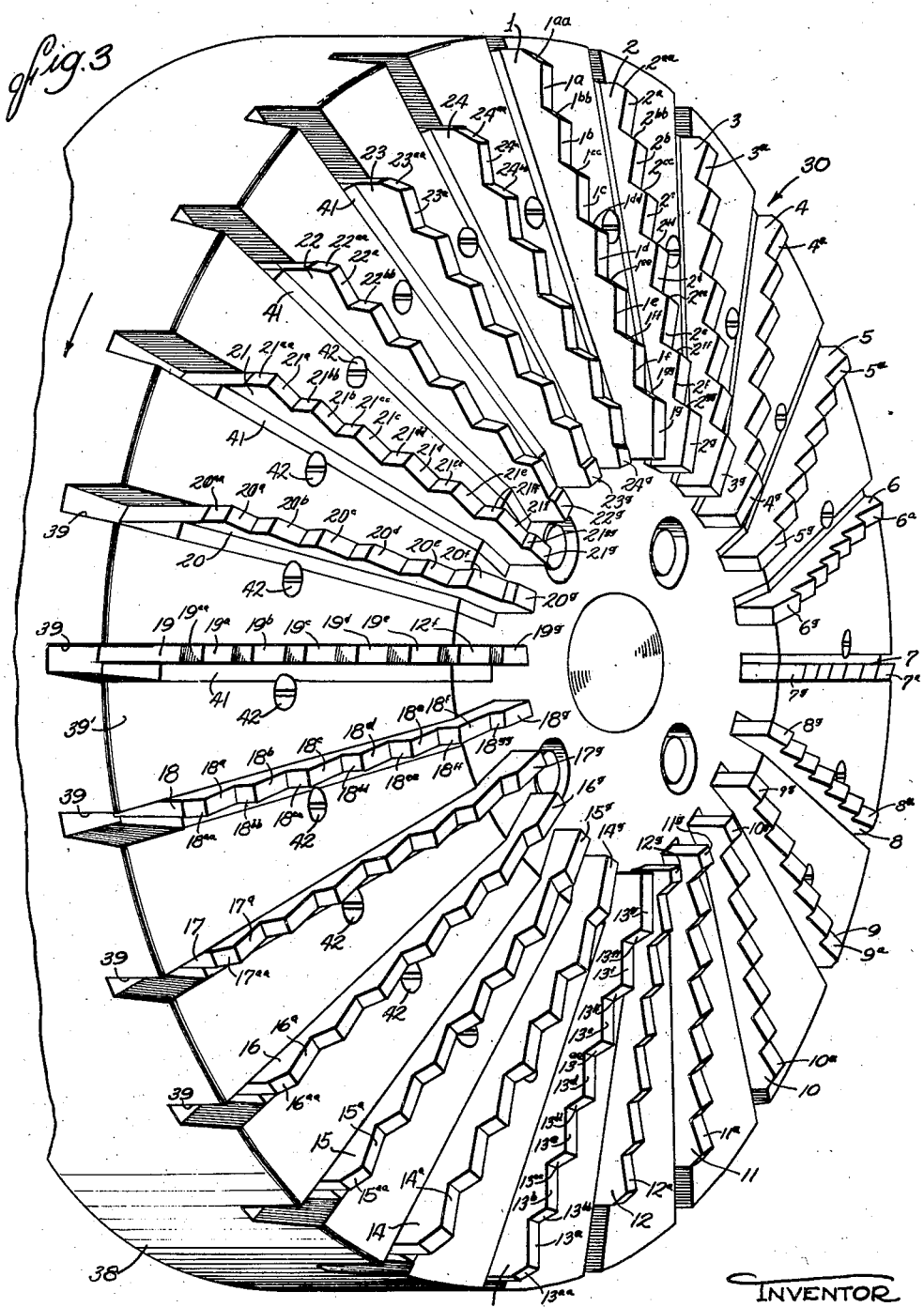

Jan. 23, 1940.  C. E. KRAUS  2,187,744
METHOD OF AND APPARATUS FOR FACE MILLING
Filed April 9, 1937  6 Sheets-Sheet 3

INVENTOR
Charles E. Kraus
By Parker, Carlson, Pitzner & Hubbard
ATTORNEYS

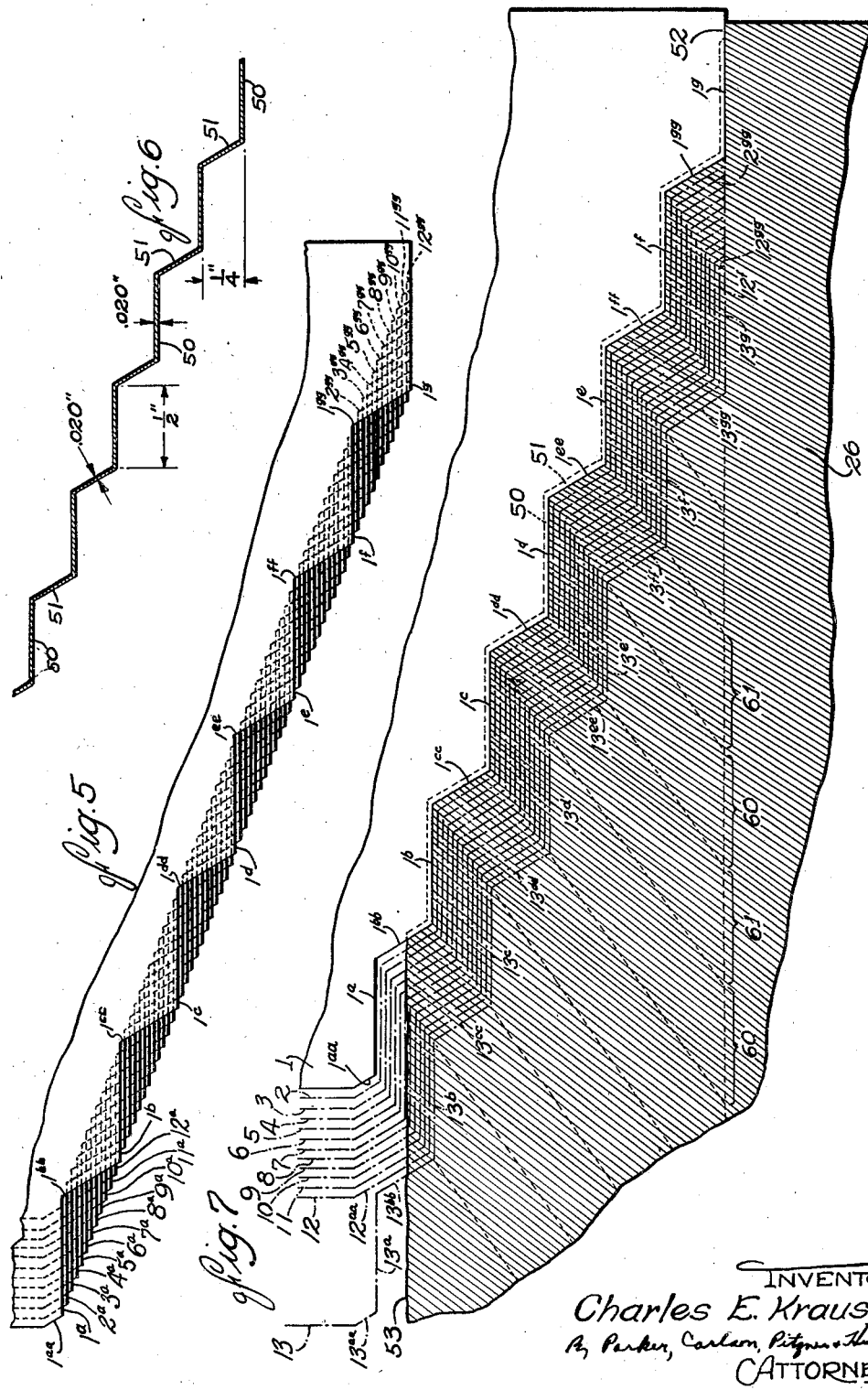

Jan. 23, 1940. C. E. KRAUS 2,187,744
METHOD OF AND APPARATUS FOR FACE MILLING
Filed April 9, 1937 6 Sheets-Sheet 5
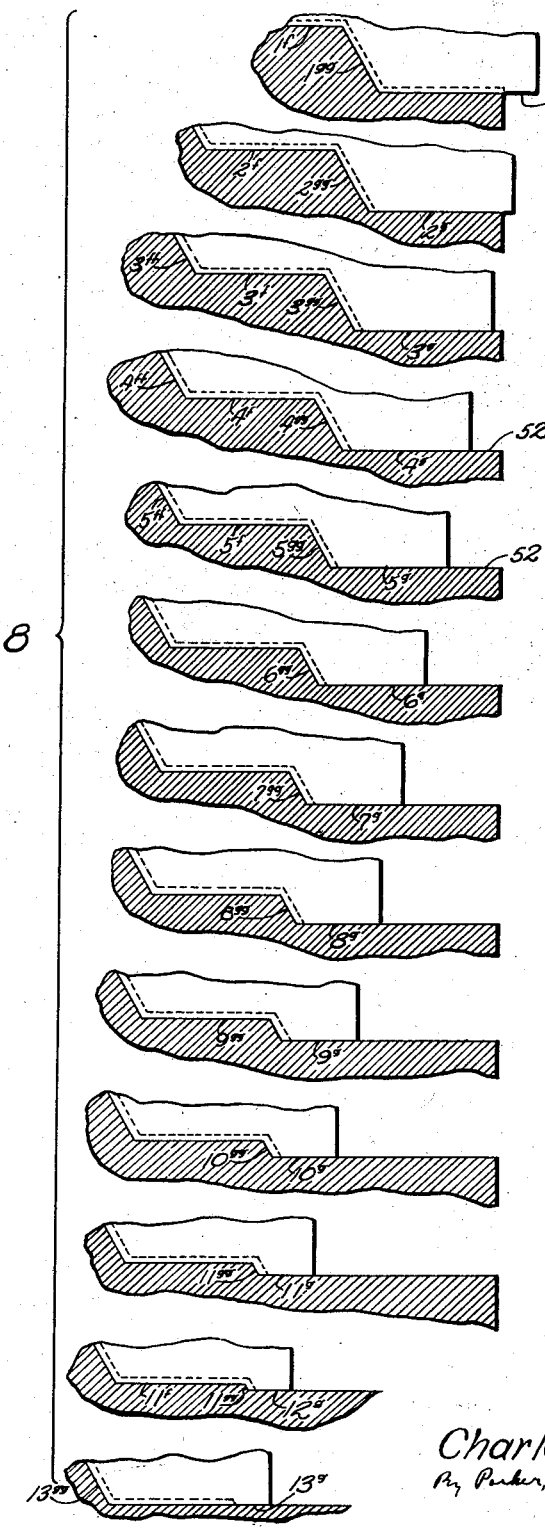

Jan. 23, 1940.   C. E. KRAUS   2,187,744
METHOD OF AND APPARATUS FOR FACE MILLING
Filed April 9, 1937   6 Sheets-Sheet 6
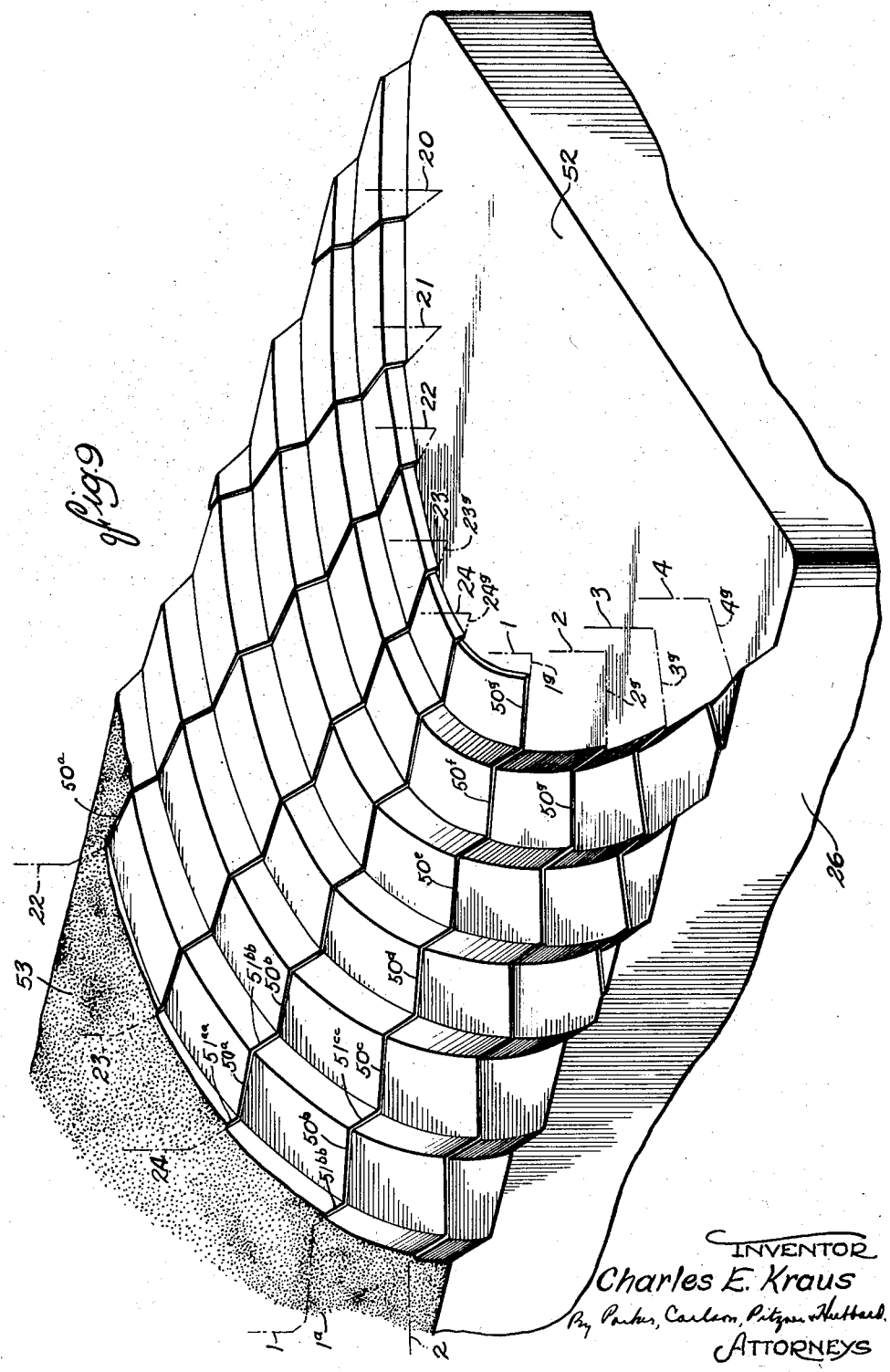

Patented Jan. 23, 1940

2,187,744

UNITED STATES PATENT OFFICE 2,187,744

METHOD OF AND APPARATUS FOR FACE MILLING

Charles E. Kraus, Rockford, Ill., assignor to The Ingersoll Milling Machine Company, Rockford, Ill., a corporation of Illinois Application April 9, 1937, Serial No. 135,836

20 Claims. (Cl. 90—18)

This invention relates to the removal of metal from a work piece to form a smooth plane surface thereon. My prior application Serial No. 116,931, filed December 21, 1936 discloses a process by which metal may be removed at a rate many times greater than by ordinary face milling processes. Said process involves the use of a series of sets of cutting edges arranged in spiral helical formation around on a cutter and adapted, during rotation of the cutter combined with a relative feeding movement, to cut thin slices of metal from overlapping zones of the work progressively from the outer face down to the final surface while at the same time maintaining a uniform torque on the cutter.

One object of the present invention is to adapt the general method above mentioned for use in removing layers of metal stock of any desired thickness.

A more detailed object is to increase substantially the number of cutting edges in each coacting spiral set without at the same time increasing the size of the cutter unduly or without destroying the uniformity of torque application to the rotating cutter.

Another object is to further increase the rate at which metal may be removed by the general method above mentioned by providing for cutting of the metal in thin layers having angularly related portions one disposed parallel to the plane of the final surface and the other extending at an angle and joined to the first portion.

Other objects and advantages of the invention will become apparent from the following detailed description taken in connection with the accompanying drawings, in which Figure 1 is a perspective view partially in section showing the elements of a typical milling machine in which the present invention may be utilized.

Fig. 2 is a fragmentary cross sectional view through one of the cutter blades and its mounting.

Fig. 3 is a perspective view of the cutter.

Fig. 5 is a view illustrating the positional relations of the edges of the different cutter blades relative to the cutter axis.

Fig. 6 is a cross sectional view of a layer of metal which is removed by one of the cutter blades.

Fig. 7 is a sectional view taken longitudinally through a partially machined work piece and one of the cutter blades, the paths traversed by the edges of other cutter blades being indicated in dotted outline.

Fig. 8 is a series of fragmentary sectional views through the work piece and the inner end portions of different cutter blades.

Fig. 9 is a perspective view of a partially machined work piece with portions of different cutter blades shown in phantom.

Figure 4:
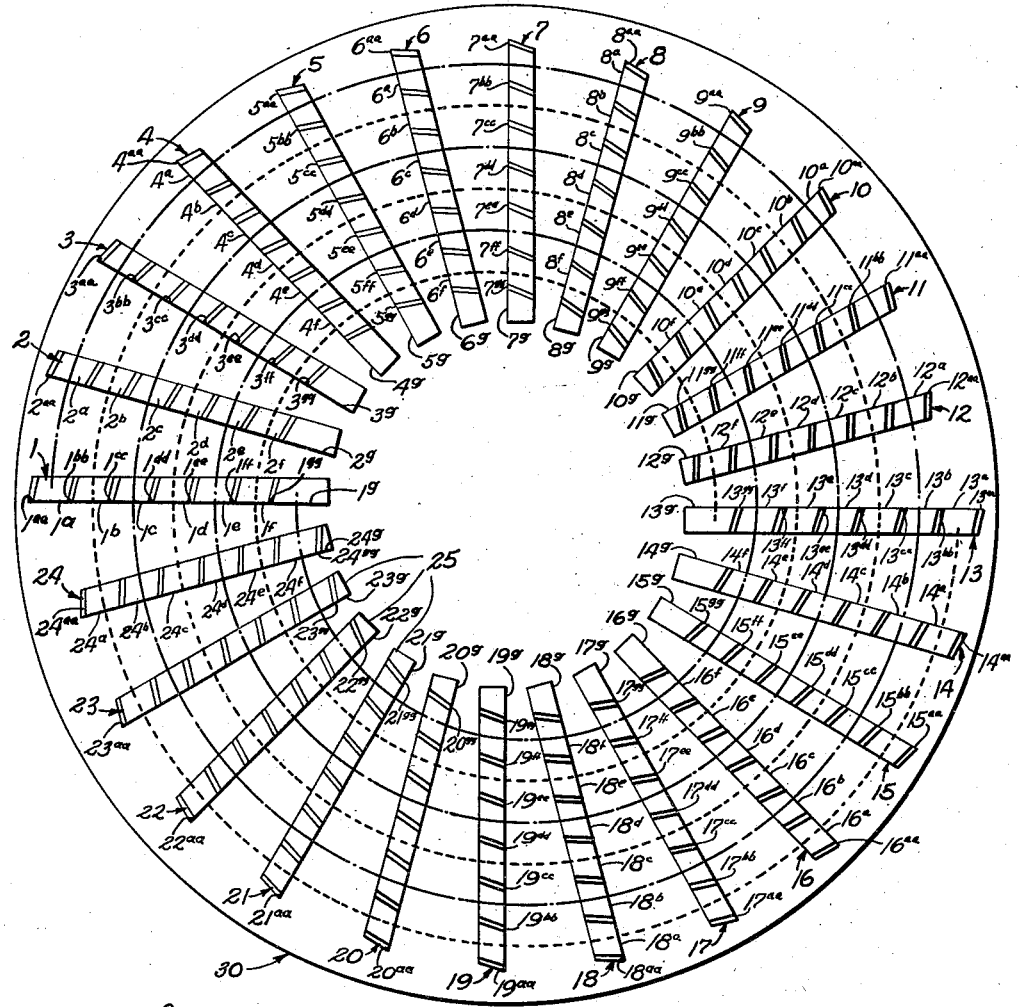
Fig. 4 is a plan view of the cutter face with certain parts omitted.

While the invention is susceptible of various modifications, I have illustrated in the drawings and will herein described in detail the preferred embodiment and method of practicing the invention. It is to be understood, however, that I do not intend to limit the invention by such disclosure but aim to cover all modifications and constructions falling within the spirit and scope of the invention as expressed in the appended claims.

Generally stated, the invention involves the use of a rotary cutter having elongated blades with radially extending cutting edges which are divided longitudinally into a series of spaced edge portions progressively stepped in a direction away from the cutter face from the outer to the inner steps and spaced apart distances greater than the thickness of the metal slices to be removed so as to provide intervening edge portions of substantial length. The steps of the different blades are positioned radially and axially of the cutter so as to form one or more groups each having a number of steps greater than the number of blades and extending in spiral helical formation through substantially more than one and preferably through several complete revolutions around the cutter face.

The improved method includes rotating the cutter with the work piece to be machined positioned with the plane of the work surface to be formed coinciding with the planes of the finally acting steps of the spiral groups and relatively feeding the work and the cutter longitudinally of the final surface at a rate per revolution of the cutter greater than the number of spiral sets of steps multiplied by the effective radial length of the individual steps. The increased feed rate is such that the intervening or side edge portions will cut slices of metal inclined relative to and of a thickness not materially greater than the slices cut by the individual steps.

Referring now to the drawings, the method may be practiced in various types of milling machines, a typical form being shown in Fig. 1. While being operated upon, the work piece indicated at 26 is secured by suitable clamps upon a work support in the form of a table 27 slidable along ways 28 on a bed 29 so as to move the work across the face of a cutter 30. The latter is carried by a spindle 31 rotatably supported with the proper rigidity in the machine frame (not shown) and driven through suitable gearing 32 by power derived from an appropriate source such as an electric motor 33.

Relative feeding movement between the cutter and the work at the required rate later to be described may be effected and controlled in various ways well understood in the art. For example, power for reciprocating the table 27 may be derived from a reversible motor 34 and transmitted through suitable speed-reducing mechanism including gearing 35 to a screw 36 meshing with a rack 37 on the table.

As shown in Figs. 1 to 4, the cutter 30 comprises a generally cylindrical body 38 having relatively closely spaced slots 39 in one end face 39' extending radially or substantially so and inclined so as to provide the rake angle desired. The slots are spaced uniformly around the cutter face and receive unitary blades individually numbered 1 to 24 and each positioned with a side portion projecting from the face of the body. Herein, each blade comprises a generally rectangular block of cutting material having an elongated continuous cutting edge formed along the leading edge of an exposed surface which is sloped away from the cutting edge to afford proper clearance.

The blades may be locked in the cutter body in various ways. In the present instance, each is clamped against the bottom and one side wall of the slot by an inwardly tapering wedge 41 received between the blade and the opposite wall of the slot and held in wedged position by a screw 42 threading into the body with its head overlying the wedge.

As contemplated by the present invention, the cutting edge of each blade is divided longitudinally into a series of straight parallel steps individually identified in conjunction with the respective blade numerals as $a$ to $g$. Preferably, the steps are of substantially equal radial lengths with the successive inwardly spaced steps $a$ to $g$ disposed in axial planes spaced increasing distances from the end face 39' of the cutter body. The adjacent ends of the adjacent steps on each blade are joined by a plurality of intervening edge portions inclined at an angle, approximately 60 degrees in the present instance, to the steps $a$ to $g$ and each merging at one end with the outer end of one step and at the other end with the inner end of the next outer step. The edge portions associated with the respective steps $a$ to $g$ are indicated individually as $aa$ to $gg$ in conjunction with the reference numerals of the respective blades.

The correspondingly lettered steps on the blades 1 to 12 are differentially positioned axially and radially of the cutter body but are positioned the same as the corresponding steps on the blades 13 to 24 respectively. This spacing is such that the edges $1^a$ to $12^a$ recede in a progressive spiral toward the cutter axis by an amount approximately equal to the individual lengths of the steps and are disposed in planes perpendicular to and spaced apart along the cutter axis distances equal to the thickness of the slices of metal to be cut thereby. In practice, it has been found desirable to employ a spacing not to exceed .020 of an inch where the cutting edges are composed of high speed steel, although it will be apparent that the thickness of the chips to be removed may be changed by various factors such as the kind of metal being worked.

The edges $13^b$ to $24^b$ are positioned radially to constitute a continuation of the spiral formed by the edges $1^a$ to $12^a$ and are similarly spaced progressively increasing distances from the cutter body in an axial direction. To enable the number of edges in the spiral set to be further increased and thereby exceed the number of blades, the edges $1^c$ to $12^c$, $13^d$ to $24^d$, $1^e$ to $12^e$, and $13^f$ to $24^f$ are arranged in spiral helical formation so as to continue the spiral formed by the edges $1^a$ to $12^a$ and $13^b$ to $24^b$. The entire group of seventy-two steps thus constitutes a single spiral set extending through three revolutions around the face of the cutter as indicated by the dot-dash line in Fig. 4. The radial and axial spacing of all of the edges in the group is illustrated in Fig. 5 which shows the cutting edges of the blades 1 to 12 rotated into a common radial plane. With the successive inwardly spaced edges beginning with $1^a$ and ending with $12^e$ axially spaced to cut successively deeper into the work and form chips .020 of an inch thick, the cutter is adapted to remove a layer of metal 1.440 inches in thickness. This dimension may of course be varied by changing the number of steps in each spiral group or the spacing of their cutting planes.

To effectually break the chips and enable blades of duplicate constructions to be used, it is preferred to make the blade steps of relatively short radial lengths and to employ more than one spiral helical set. For this purpose, the alternate steps of each blade are arranged to form a second set of edges which, in the present instance, starts with the blade and includes the edges $13^a$ to $24^a$, $1^b$ to $12^b$, $13^c$ to $24^c$, $1^d$ to $12^d$, $13^e$ to $24^e$, and $1^f$ to $12^f$. The seventy-two steps of this spiral recede progressively toward the cutter axis as indicated by the dot line in Fig. 4 and the successive inwardly spaced steps are axially spaced .020 of an inch apart and progressively away from the end face of the cutter body. It will thus be seen that each blade of the cutter illustrated herein contributes three steps to each of the two different spiral sets. Also, the blades 13 to 24 inclusive are of the same construction, and their steps $a$ to $f$ are located in the same position as the corresponding steps of blades 1 to 12 respectively By virtue of the two spiral sets of edges alone, the cutter above described permits of a feed movement per revolution of the cutter equal to twice the radial length of the individual steps. To further increase the permissible rate of feed, advantage is taken of the fact that the adjacent steps $a$ to $f$ on each blade are spaced apart distances greater than the thickness of the chips cut by the individual steps. Thus, the intervening or side edge portions $aa$ to $ff$ are utilized to cut additional slices of metal angularly disposed relative to the slices removed by the individual blade steps $a$ to $g$. To this end, the edge portions $aa$ to $gg$ are sharpened throughout their lengths and are joined at opposite ends to the outer and inner ends of the next adjacent inner and outer steps. Each blade edge is thus effective throughout its entire length and is adapted, when the cutter is fed at the proper rate, to cut from the work a layer of metal (see Fig. 6) having space portions 50 disposed parallel to the direction of feed and cut by the blade steps $a$ to $g$ and inclined connecting portions 51 cut by the side edge portions $aa$ to $ff$. With cast iron work pieces, the portions 50 and 51 break apart so that the chips formed are not greater in width than the lengths of the cutting edge portions $a$ to $f$ and $aa$ to $ff$. In the cast of steel, the cutting edges may be notched to insure proper chip breakage. Since the edge portions $aa$ to $ff$ extend at an angle to the direction of the feed, the chip portions 51 cut thereby will, of course, vary with the rate of feed. Preferably, a feed rate is selected which will result in the cutting of portions 51 not greater in thickness than the portions 50.

To enable the feed rate to be increased as above described through the use of edge portions $aa$ to $gg$ and at the same time utilize the available blade lengths to full advantage, the innermost ends of the blades are each formed with an angular edge portion $gg$ of progressively shorter lengths in the blades 1 to 12 as illustrated in Figs. 3, 4 and 5. These portions merge with steps $g$ all of which are disposed in a common plane spaced .020 of an inch from the plane of the final steps $12^f$ and $24^f$ in the two spiral groups above referred to. The steps $1^g$ and $13^g$ are of sufficient radial length to overlap the portion of the work traversed by the edges $24^f$ and $12^f$ respectively while the edges $g$ on the blades 2 to 12 may decrease progressively in length as shown in Figs. 4 and 8 so that the inner ends of the blades may terminate at equal radii. While the steps $2^g$ to $12^g$ and $14^g$ to $24^g$ may be omitted if desired, they do assist in the formation of a smooth final surface 52 on the work piece. It is preferred to provide additional inner steps $g$ on each of the other blades, all of these being disposed in a common plane including the steps $1^g$ and $13^g$.

The manner in which the blades act to cut slices of metal from a work piece and remove all of the metal from the rough surface 53 down to the final or finished surface 52 is illustrated in Figs. 7, 8, and 9. The work piece 26 to be operated upon is first clamped on the table 27 with the plane of the edges $g$ coinciding with the final surface 52 to be formed. The rough surface of the work piece shown coincides approximately with the plane of step $7^a$. Then with the cutter rotating, the table 27 is advanced at a continuous predetermined rate to carry the work across the face of the cutter.

To utilize the cutter to best advantage, the table drive mechanism is conditioned for feeding of the work during each revolution of the cutter through a resultant distance composed of two increments one determined by the number of the spiral groups and the individual lengths of the blade steps $a$ to $g$. With one-half inch steps and two spiral sets, this increment would be equal to one inch. The other increment of feed is a function of the number of blades, the maximum permissible thickness of the clip portions 51 and the angle at which these are disposed relative to the direction of feed. In the present instance, there are 24 blades, the assumed chip thickness is .020 of an inch, and the inclination of the intervening edge portion $aa$ to $gg$ is approximately sixty degrees. Therefore, said second increment of feed is .555 of an inch, making a total of 1.5 inches per revolution of the cutter.

As the cutter rotating in the direction indicated by the arrows in Figs. 4 and 9 engages the work, the edge portions $aa$ to $gg$ will be the first to act, it being observed that the rough surface 53 of the work is disposed below the level of the steps $1^a$ to $6^a$. When the cutter has passed partially through the work, the surface of the latter will be reduced to the shape shown in Fig. 9. Now, as the blade 1 moves across the work, a continuous layer of metal composed of portions $50^b$ to $50^g$ and $51^{bb}$ to $51^{gg}$ will be severed. Succeeding blades 1 to 12 will remove similarly shaped and stepped layers of metal as indicated by the spacing of the dotted lines in Fig. 9 which represent the cutting edges of the different blades. The final slice of metal is removed by the steps $1^g$ and $13^g$ but the surface thus formed is traversed and cleaned up by the successively shorter steps $2^g$ to $11^g$ and $14^g$ to $24^{gg}$. Also, it will be noted from Fig. 8 that the edges $1^{gg}$ to $12^{gg}$ cut slices $50^{gg}$ of progressively shorter lengths.

By virtue of the increase in the feed rate which is made possible by efficient utilization of the intervening edge portions $aa$ to $gg$, it will be seen from Fig. 8 that the steps of the spiral sets remove slices of metal from inclined arcuate zones 60 of the work spaced apart along the work, the slices 50 of metal removed from each zone extending parallel to the final work surface. The metal is removed from the intervening arcuate zones 61 in thin slices 51 by the edges $aa$ to $gg$ associated with one spiral group of steps. Thus, the slices of the intervening zones are inclined away from the final surface 52 in the direction of the feed but the zone as a whole converges toward the finished surface. All of the metal stock is thus removed down to the plane of the final surface 52 which is left clean and smooth and this, without necessitating a high degree of accuracy in the location of the different cutting edge portions radially of the cutter.

By providing cutter blades of substantial radial lengths and utilizing several steps on each blade as one edge of a multiple turn spiral, it is possible to provide any desired number of cutting edges in each spiral set without necessitating close angular spacing of the adjacent edges. Thus, in the present instance, the blades 1 to 24 are angularly spaced apart sufficiently to provide adequate clearance for the substantial volume of chips which is formed. This arrangement also insures the maintenance of a uniform torque on the cutter during its engagement with the work.

I claim as my invention:

1. The method of milling a work piece to form a plane surface thereon which comprises removing metal from spaced arcuate zones of the work in thin slices progressing from the rough surface down to the final surface and extending parallel to the latter with each zone converging toward said final surface, and removing metal from the intervening work zones by cutting thin slices inclined relative to said first mentioned slices and progressing toward said final surface.

2. The method of milling a work piece to form a plane surface thereon which comprises cutting metal from spaced arcuate zones of the work in thin slices extending parallel to said final surface and converging toward the latter in the direction of relative feed between the cutting edges and the work, and cutting from the intervening zones of the work thin slices of metal extending at angles to and merging with the first mentioned slices.

3. The method of milling a work piece to form a plane surface thereon which comprises cutting from spaced arcuate zones of the work thin slices of metal extending parallel to said final surface and progressing toward the latter, and cutting from the respective intervening zones of the work thin slices of metal extending at angles to the first mentioned slices and progressing toward said final surface.

4. The method of milling a work piece to form a plane surface thereon which comprises simultaneously cutting from spaced arcuate zones of the work thin slices of metal extending parallel to said final surface and progressing toward the latter, and simultaneously cutting from all of the respective intervening zones of the work thin slices of metal extending at angles to and merging with the first mentioned slices.

5. The method of face milling a metallic work piece to form a continuous flat surface thereon which comprises revolving one or more sets of radial cutting edges about a common axis with the edges of each set arranged in spiral formation and the successive inwardly spaced edges disposed in parallel axially separated planes spaced apart distances substantially less than the individual radial lengths of the edges, simultaneously revolving sets of second cutting edges each disposed at an angle to and connected at the outer end of one of said radial edges, supporting a work piece with the plane of the innermost one of said radial edges coinciding with the final work surface to be produced, and relatively moving the work piece and said edges longitudinally of said planes at a continuous rate a distance per revolution of said cutter greater than the radial length of the individual radial edges multiplied by the number of said sets whereby to subject advancing arcuate zones of the work to the action of the respective sets of radial and associated edges and cause removal of metal in successive layers each having angularly related portions.

6. The method of removing metal from a work piece to form a plane surface, which comprises causing a continuous feeding movement between the work and a revolving series of cutting edges along the plane of the final finished surface, and during such movement taking arcuate cuts successively from the outer face toward the final surface to remove the metal in thin layers each having one straight portion extending parallel to said final surface and a second portion extending at an acute angle thereto and constituting a continuation thereof.

7. The method of removing metal from a work piece to form a plane surface, which comprises causing a continuous feeding movement between the work and a revolving series of cutting edges along the plane of the final finished surface, and during such movement taking arcuate cuts successively from the outer face toward the final surface to remove the metal in thin layers each having one portion extending parallel to said final surface and a second portion extending at an acute angle thereto.

8. The method of removing metal from a work piece to form a plane surface, which comprises causing a continuous feeding movement between the work and a revolving series of cutting edges along the plane of the final finished surface, and during such movement taking arcuate cuts successively from the outer face toward the final surface to remove the metal in thin layers each having one straight portion which is wide in the direction of the feed and thin in a perpendicular direction, and a second portion which is thin in the direction of the feed and wide in a direction inclined relative to said final surface.

9. For removing metal from a work piece to form a plane surface thereon, a face milling machine comprising, in combination, a power rotated cutter having one or more sets of cutting edges arranged in spiral helical formation respectively disposed in planes spaced along the axis of the cutter, a second series of cutting edges on said cutter each associated with the outer end of one of said first mentioned edges and extending at an angle relative thereto, means for supporting a work piece for engagement successively by said first mentioned edges, and mechanism for relatively feeding said cutter and work piece continuously and through a distance per revolution of the cutter greater than the effective individual radial length of the first mentioned edges multiplied by the number of said spiral sets of first mentioned edges.

10. For removing metal from a work piece to form a plane surface thereon, a face milling machine comprising, in combination, a power rotated cutter having a series of cutting edges arranged in spiral helical formation respectively disposed in planes spaced along the axis of the cutter, a second series of cutting edges on said cutter each associated with the outer end of one of said first mentioned edges and extending at an angle relative thereto, means for supporting a work piece for engagement successively by said first mentioned edges, and mechanism for relatively rotating the cutter and the work along said surface at a rate such that each of said first cutting edges and the associated second cutting edge removes a chip having angularly related portions.

11. For removing metal from a work piece to form a plane surface thereon, a face milling machine comprising, in combination, a power rotated cutter having a series of cutting edges arranged in one or more sets, each set comprising a plurality of such edges of substantially equal radial lengths angularly spaced around one end face of the cutter in spiral formation with the successive inwardly spaced edges of each spiral set disposed in substantially parallel planes progressively spaced away from the cutter face, the effective radial lengths of the individual first edges being several times greater than the spacing of the adjacent planes thereof, a second cutting edge for each of said first edges extending at an angle and joined to the outer end of such edge and having an effective length greater than the spacing of said adjacent planes, means supporting said work piece and said cutter for relative feeding movement longitudinally of said planes and with the plane of the innermost first edge of each of said sets coinciding with the plane of the final work surface to be formed and with the cutter axis disposed substantially perpendicular to the plane of the feeding movement, and power operated mechanism for relatively and continuously feeding the work piece and said cutter during each revolution of the cutter through a distance slightly greater than the individual radial length of said edges multiplied by the number of said spiral sets of edges but sufficient to effect removal of successive metal layers each having one leg equal to the radial length of one of said first edges and a second leg formed by the associated second leg.

12. A cutter adapted to machine a plane surface on a work piece when the cutter is rotated about its axis and is relatively fed in a direction parallel to said surface, said cutter comprising a rotatable body and a series of cutting edges extending in spiral helical formation through substantially more than a revolution around an end face of said body and disposed in planes approximately perpendicular to the axis of the body with the initial cutting edge toward the periphery of the body.

13. A cutter adapted to machine a plane surface on a work piece when the cutter is rotated about its axis and is relatively fed in a direction parallel to said surface, said cutter comprising a rotatable body, and a plurality of sets of approximately radially extending cutting edges on said body, the edges of each set being arranged in spiral helical formation and extending more than a complete revolution around the end face of the body and the adjacent initial edges of the different sets being spaced apart substantially equal distances around the entire periphery of said body.

14. A cutter adapted to machine a plane surface on a work piece when the cutter is rotated about its axis and is relatively fed in a direction parallel to said surface, said cutter comprising a rotatable body, a plurality of blades arranged in angularly spaced relation around an end face of said body, a cutting edge on each blade extending in a generally radial direction and divided longitudinally into a plurality of substantially parallel first portions and intervening second portions each extending transversely of the first portions, the first edge portions of a series of adjacent blades cooperating to form a set of edges adapted to act successively on a work piece and extending spirally for more than a complete revolution around said body, and the axial spacing of the adjacent first edge portions of each blade being substantially greater than the depth of cut capable of being taken thereby whereby each first portion and the adjacent second portion cooperate in cutting a chip having angularly related legs.

15. A cutter adapted to machine a plane surface on a work piece when the cutter is rotated about its axis and is relatively fed in a direction parallel to said surface, said cutter comprising a rotatable body, and a plurality of approximately radially extending cutting edges on said body arranged in spiral helical formation around an end face of said body with opposite end portions of the spiral overlapping each other.

16. A cutter adapted to machine a plane surface on a work piece when the cutter is rotated about its axis and is relatively fed in a direction parallel to said surface, said cutter comprising a rotatable body, a multiplicity of approximately radially extending cutting edges on said body arranged around an end face of said body in a plurality of overlapping spiral sets each extending through more than a complete revolution, and a plurality of blades on said body each having formed thereon edges of different spiral sets and a plurality of the edges of any one set.

17. A cutter adapted to machine a plane surface on a work piece when the cutter is rotated about its axis and is relatively fed in a direction parallel to said surface, said cutter comprising a rotatable body, a multiplicity of approximately radially extending cutting edges on said body arranged around an end face of said body in a plurality of overlapping spiral sets each extending through more than a complete revolution, and blades of a number less than the number of edges on each set angularly spaced around the body and having all of said edges formed thereon, certain of said blades having the edges of different spiral sets and a plurality of edges of the same set arranged thereon in alternating relation.

18. A cutter adapted to machine a plane surface on a work piece when the cutter is rotated about its axis and is relatively fed in a direction parallel to said surface, said cutter comprising a rotatable body, and a set of cutting edges on one axial face of the body extending in spiral helical formation therearound through more than a full revolution, the successive inwardly spaced edges being arranged for action successively on a work piece.

19. A cutter adapted to machine a plane surface on a work piece when the cutter is rotated about its axis and is relatively fed in a direction parallel to said surface, said cutter comprising a rotary body, a plurality of radially extending blades angularly spaced around an end face of said body and each having an elongated cutting edge divided longitudinally into a plurality of steps disposed in planes substantially perpendicular to the cutter axis and progressing in a direction away from said face from the outermost to the innermost steps, at least one step on each of said blades and an additional step on at least a plurality of the blades cooperating to form a set of cutting edges adapted for successive action on a work piece and extending spirally around the cutter axis through more than a complete revolution.

20. A cutter adapted to machine a plane surface on a work piece when the cutter is rotated about its axis and is relatively fed in a direction parallel to said surface, said cutter comprising a rotatable body, a group of approximately radially extending blades arranged around one axial face of said body and having a cutting edge divided longitudinally into a plurality of substantially parallel portions progressively stepped in a direction away from said face from the inner to the outer ends of the blades, the outermost portions of successive blades being arranged in spiral helical formation, and the successively inwardly spaced portions of said blades respectively being similarly arranged in spiral helical formation.

CHARLES E. KRAUS.